United States Patent

Cooper

[15] 3,681,529

[45] Aug. 1, 1972

[54] COMMUNICATIONS APPARATUS FOR TRANSMITTING AND RECEIVING SYNCHRONOUS AND ASYNCHRONOUS DATA

[72] Inventor: Stuart B. Cooper, Framingham, Mass.

[73] Assignee: Honeywell Information Systems Inc., Waltham, Mass.

[22] Filed: Nov. 19, 1970

[21] Appl. No.: 90,976

[52] U.S. Cl. ....................178/70 R
[51] Int. Cl. ....................H04l 25/52
[58] Field of Search ....................178/70 R, 17 R

[56] References Cited

UNITED STATES PATENTS

| | | | |
|---|---|---|---|
| 3,327,230 | 6/1967 | Konian | 178/70 |
| 3,355,549 | 11/1967 | Alexander | 178/70 |
| 3,384,711 | 5/1968 | Boxall | 178/70 |

*Primary Examiner*—Kathleen H. Claffy
*Assistant Examiner*—William A. Helvestine
*Attorney*—Ronald T. Reiling and Fred Jacob

[57] ABSTRACT

Bipolar pulses received over a communications line are restored to a bilevel signal condition. A sync signal is also developed from the received bipolar pulses. Local terminal means are provided to transmit data having a bilevel characteristic, when enabled by a request to send signal. Transmit mode selection means are utilized to pass either the terminal data or restored signal and either the sync signal or a locally generated clock signal, depending on the state of the request to send signal. Sampling means responsive to the clock or sync signal develops a timing pulse at which time bipolar pulses for transmission over communications lines are generated, the polarity of the bipolar pulses depending upon the level of the terminal data or restored signal to be transmitted.

14 Claims, 20 Drawing Figures

INVENTOR

Stuart B. Cooper

By John S. Solakian

Attorney

INVENTOR
Stuart B. Cooper

By John S. Solakian
Attorney

INVENTOR
Stuart B. Cooper
By [signature]
Attorney

INVENTOR

Stuart B. Cooper

By John S. Silakian

Attorney

COMMUNICATIONS APPARATUS FOR TRANSMITTING AND RECEIVING SYNCHRONOUS AND ASYNCHRONOUS DATA

BACKGROUND OF THE INVENTION

1. Field of the Invention

This invention relates generally to communications apparatus and more particularly to apparatus adapted to receive and retransmit information and adapted to transmit data from local terminal means.

2. Prior Art

In data processing apparatus, difficulty has been experienced over the years in transmitting digital data at relatively high speeds over cables longer than a few hundred feet. Frequency distortion, non-linear amplitude distortion, delay distortion, severe ground shift, cross talk, noise and insertion loss are some of the more serious problems experienced in pulse transmission.

Typical commercial equipment in existence today frequently is characterized by relatively extensive and elaborate equipment for the transmission of even relatively low frequency data signals; for example, data transmission sets which are capable of transmitting data at the rate of 1200 baud over telephone lines, typically include circuits responsive to bipolar data pulses for transmitting data over telephone lines by frequency shift or phase shift techniques. Circuits must then be provided at the terminating end of the telephone line for changing the data from the frequency or phase shift form to bipolar pulse form. Even this apparatus exhibits severe reliability problems and sophisticated, expensive circuitry is often required.

In local communications applications for example in an airlines terminal where several stations are grouped and such stations within the group are spaced apart by several hundred feet, a reliable and inexpensive communications interface must be provided for not only repeating information received from a transmitting station but repeating the information for transmission to a master station. Each station must also have a capability of transmitting its own data over the communication lines.

It is therefore an object of this invention to provide communications apparatus capable of receiving and retransmitting data while restoring such data before retransmission.

It is another object of this invention to provide communications apparatus capable of providing for the receipt and retransmission of data as well as the transmission of data from a local terminal.

It is a further object of this invention to provide communications apparatus of the type hereinbefore described which is inexpensive, reliable and which further provides electrical isolation between the communication line and the transmitting and receiving communications apparatus.

SUMMARY OF THE INVENTION

The purposes and objects of this invention are satisfied by providing communications apparatus for receiving and transmitting bipolar signals having first and second polarities over communication lines, the apparatus including means for restoring signals received and means for retransmitting the signals received and including local terminal means for generating signals having first and second levels to be transmitted and for generating a request to send signal so that the terminal means signals may be transmitted. Means for restoring signals received comprises means for separating the first and second polarity bipolar signals and bistable means coupled to the means for separating for generating a first level of the restored signal in response to the occurrence of the first polarity bipolar signal and for generating a second level of the restored signal in response to the appearance of the second polarity bipolar signal. Also provided are means responsive to the first and second polarity bipolar signals for generating a sync signal whose frequency is no less than the frequency of the received bipolar signals and further means for generating a clock signal having a first frequency which is no less than the frequency of the terminal means signal to be transmitted. The means for transmitting comprises first gate means for passing either the clock signal or the sync signal in response to the presence or absence respectively of the request to send signal and second gate means for passing either the terminal means signal or the restored signal in response to the presence or absence respectively of the request to send signal. Also provided in the means for transmitting are means responsive to whichever of the clock or sync signals are passed by the first gate means, for generating a timing pulse for sampling signals to be transmitted. Additionally, first means for generating a first polarity output signal are provided for transmission over the communication lines in response to the simultaneous occurrence of the timing pulse and the first level of whichever of the restored signal or terminal means signal is passed by the second gate means and also second means for generating a second polarity output signal is provided for transmission over the communications lines in response to the simultaneous occurrence of the timing pulse and the second level of whichever of said restored signal or terminal means signal is passed by the second gate means.

BRIEF DESCRIPTION OF THE DRAWINGS

The advantages of the foregoing configuration of this invention will become more apparent upon reading the accompanying detailed description in conjunction with the figures in which.

DETAILED DESCRIPTION OF THE PREFERRED EMBODIMENT

Figure 1:
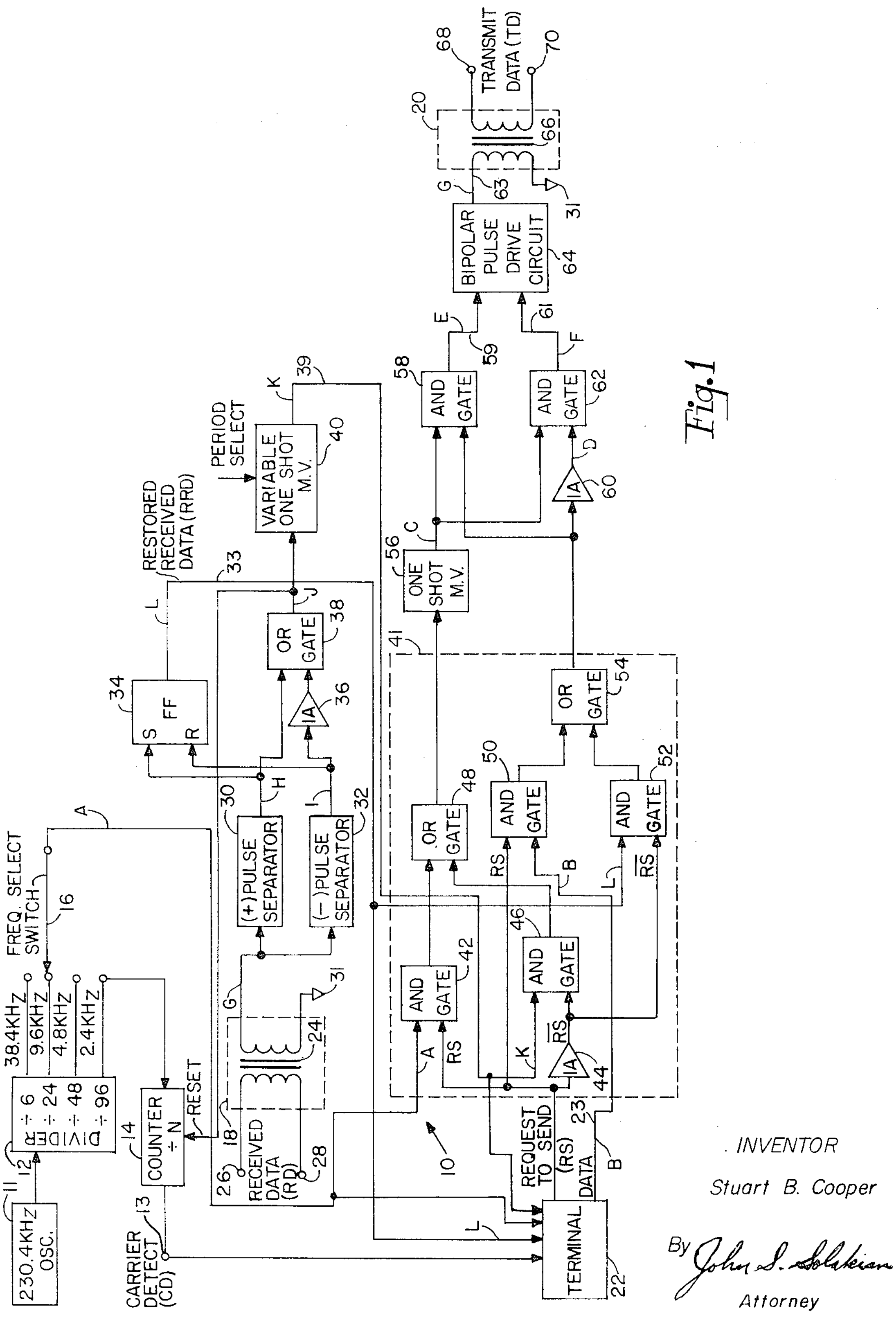
FIG. 1 is a schematic block diagram of a preferred embodiment of the communications apparatus of the invention.
Figures 2A, 2B, 2C, 2D, 2E, 2F, 2G, 2H, 2I, 2J, 2K, 2L:
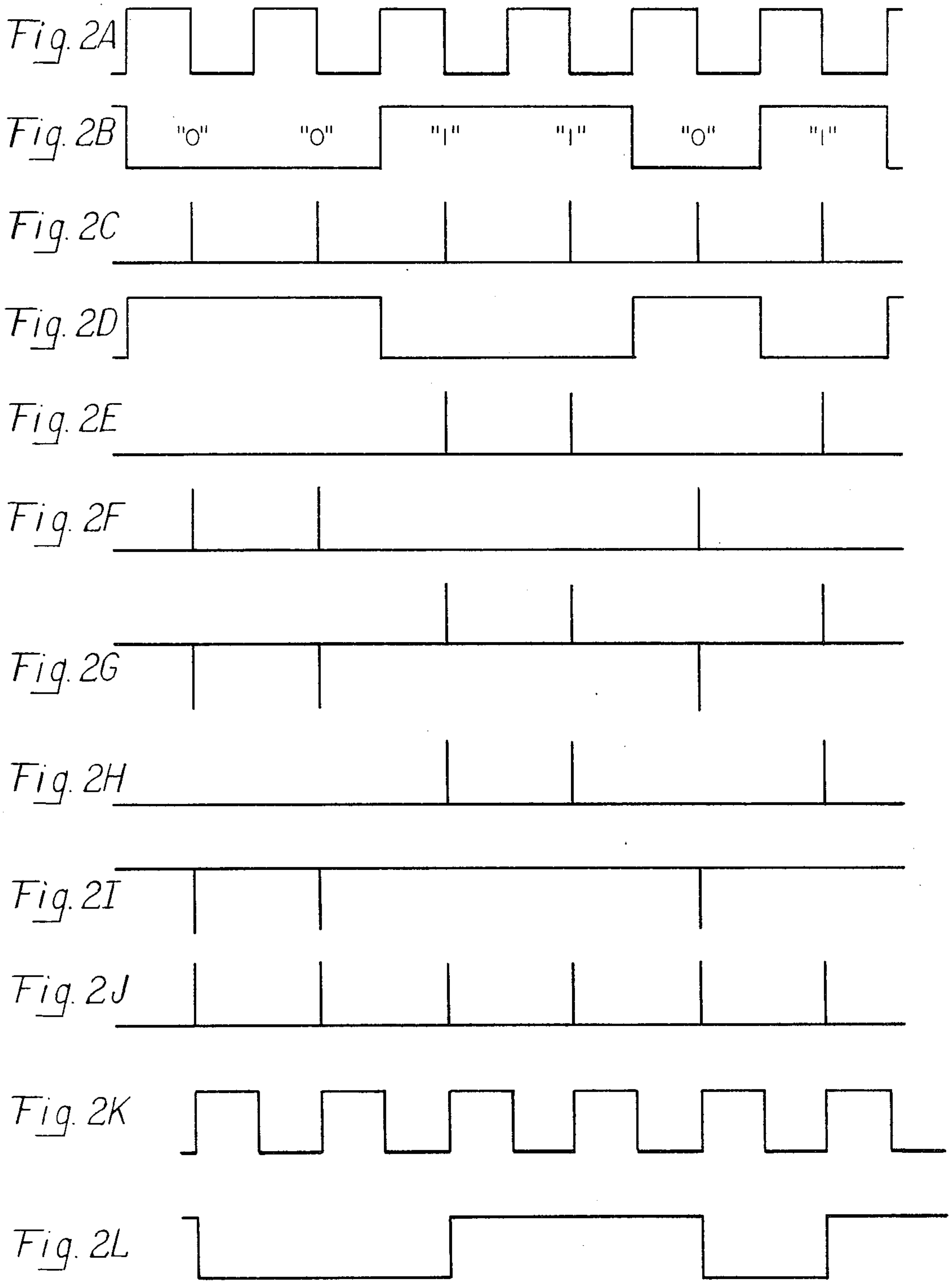
FIGS. 2A–2L are timing diagrams is a timing diagram illustrating the synchronous operation of the embodiment shown in FIG. 1.
Figures 3A, 3B, 3C, 3G, 3K, 3L:
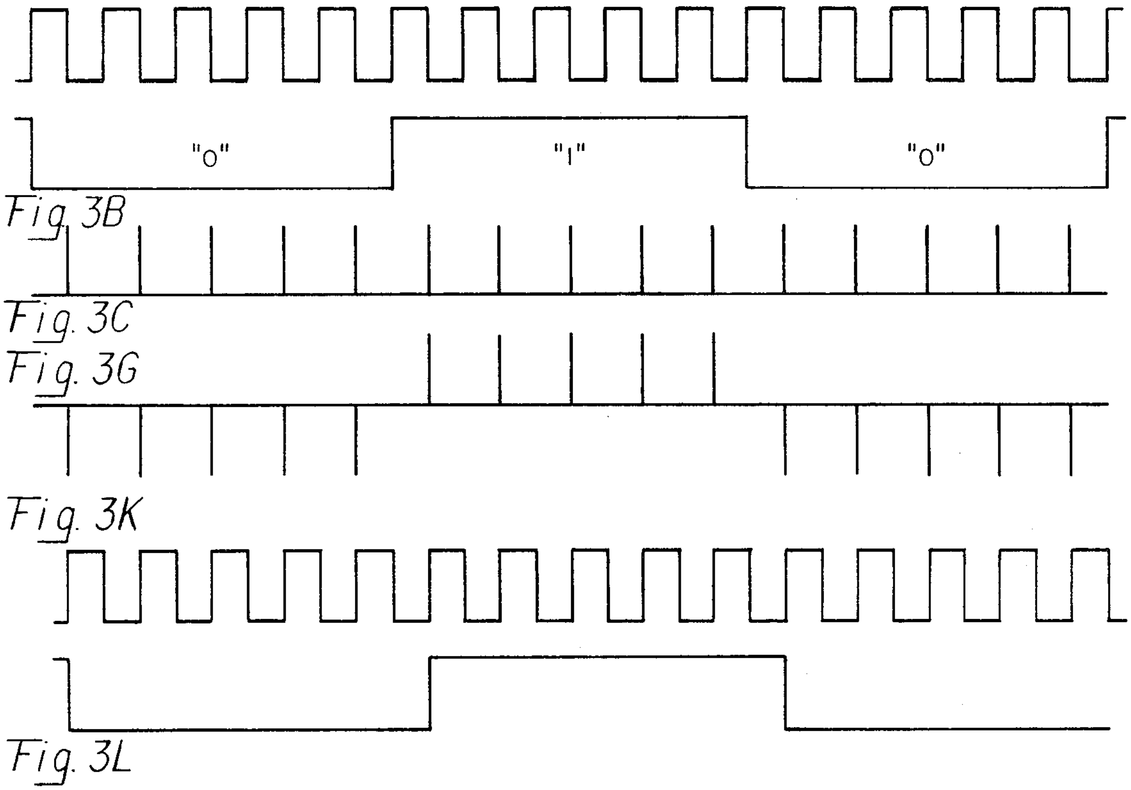
FIGS. 3A, 3B, 3C, 3G, 3K and 3L are timing diagrams is a timing diagram illustrating the asynchronous operation of the embodiment of the invention shown in FIG. 1.

FIG. 1 illustrates communications apparatus 10 which includes all elements shown except the terminal 22. Communications apparatus 10 includes input terminals 26 and 28 for receiving data or signals. The received signals which are illustrated to be bipolar wherein the signal train includes positive and negative pulses which may be uniformly spaced in time, are coupled to pulse separators 30 and 32 by means of an isolation device 18 which may be a pulse transformer 24. In a first mode of operation, bipolar pulses received are restored to the bilevel state by means of a bistable multivibrator or flip-flop 34 in response to the separated pulse signals. A sync signal is developed on line 39 in response to the separated pulses by means of a variable monostable multivibrator or one shot 40. The frequency of the sync signal developed on line 39 by one shot 40 is selected to have a period which is not less than the period of the data received at terminals 26 and 28. In the synchronous mode the periods are equal while in the asynchronous mode the period of the sync signal on line 39 is greater than the period of the received data.

When the request to send signal which is shown to be generated by terminal 22 is absent, mode selection means 41 passes the restored signal on line 33 to the input of inverting amplifier 60. The sync signal on line 39 is passed via mode selection circuit 41 to the input of monostable multivibrator or one shot 56. One shot 56 is selected to develop a pulse of short duration occurring for proper sampling at substantially the center of the restored data. AND gates 58 and 62 pass the high and low level signal conditions of the signal at the input of inverting amplifier 60 so as to generate a pulse on either line 59 or 61 depending on the level of the signal. Bipolar pulse drive circuit 64 is responsive to the input pulses on lines 59 and 61 to generate a bipolar pulse on line 63, the polarity of which bipolar pulses is determined by the input of circuit 64 receiving the input pulse. Isolation means 20 which may be a pulse transformer 66 is provided to isolate the communications apparatus from the communications line which are connected to output terminals 68 and 70.

In a second mode of operation during synchronous operation when a request to send signal from terminal 22 is present, then data generated by terminal 22 on line 23 is passed to the input of inverting amplifier 60. The terminal 22 may be a cathode ray tube display, teletypewriter, data processor, etc. A clock signal is generated by means of oscillator 11 and divider 12 which clock signal corresponds in frequency to the data on line 23. A clock signal is passed through mode selection circuit 41 to the input of one shot 56 and a bipolar signal is generated as stated hereinbefore for transmission over communication lines via terminals 68 and 70.

More particularly in the second or terminal transmit mode and with the request to send signal present and with reference to the timing diagram of FIGS. 2A–2L hereinafter referred to as waveforms A–L respectively, synchronous operation of the communications apparatus 10 is as follows. Synchronous operation is shown by example to be operable for frequencies of 9.6 KHertz, 4.8 KHertz or 2.4 KHertz, which clock signals are generated by means of an oscillator 11 which generates a signal having a frequency of 230.4 KHertz. Divider 12 generates signals by dividing the oscillator 11 frequency by 6, 24, 48 and 96 to produce a 38.4 KHertz clock signal, a 9.6 KHertz clock signal, a 4.8 KHertz clock signal, and a 2.4 KHertz clock signal respectively. The 38.4 KHertz clock signal is used for asynchronous operation and will be discussed hereinafter. As shown for synchronous operation, a frequency select switch 16 is set to provide a clock signal of 9.6 KHertz shown in FIG. 2 as waveform A. The output of switch 16 (waveform A) is coupled to the mode selection means 41 and may also be coupled to terminal 22. The data or signal to be transmitted by terminal 22 is shown on line 23 as waveform B and illustrates two data signals representing two consecutive binary zeros each of which has a low level, followed by two consecutive binary ones each of which has a high level, which signals are further followed consecutively by a single binary zero and a single binary one. The data is fed to the input of an AND gate 50 and with the request to send signal (RS) enabled, gate 50 passes the data to OR gate 54 and then to the inputs of inverting amplifier 60 and AND gate 58. The complement of the data is coupled as waveform D to one input of AND gate 62. The clock signal indicated by waveform A and the RS signal enables AND gate 42, which passes the clock signal through OR gate 48 to the input of one shot 56. One shot 56 triggers on the negative transition of waveform A to produce pulses of short time duration as shown by waveform C.

The presence of these pulses (waveform C) enables AND gates 58 and 62 to pass pulses to lines 59 and 61 depending on the level of the waveforms B and D. Binary one pulses are passed to line 59 and are shown as waveform E whereas binary zero pulses (waveform F) are passed to line 61. Pulses on line 59 trigger the bipolar pulse drive circuit 64 to produce positive pulses on line 63 as shown by waveform G. Pulses on line 61 trigger circuit 64 to produce negative pulses on line 63, also shown as waveform G. The bipolar pulse drive circuit 64 may be of any well known design such as a differential input operational amplifier having a single output coupled to a push-pull power stage.

The bipolar pulses on line 63 are isolated by means of transformer 66 and transmitted via terminals 68 and 70 over communications lines which may be in the order of several hundred feet. More particularly communication lines of 2,500 feet in length have been utilized with the communications apparatus of this invention. Although the input and output isolation means 18 and 20 are shown to include pulse transformers 24 and 66 other isolating devices such as photodiodes may be utilized. The use of isolation devices are necessary for communication lines of several hundred feet since the voltage level of ground 31 for each distant communications apparatus 10 may be at different voltage levels. In the first mode of operation or receive retransmission mode during the synchronous operation of the communication apparatus 10, bipolar pulses received at terminals 26 and 28 are passed through isolation means 18 to pulse separators 30 and 32. Note that the received data or bipolar pulses have been shown for simplicity of discussion to have the shape of that pulse train shown as waveform G. Plus (+) pulse separator 30 gates the positive pulses shown as waveform H whereas the minus (−) pulse separator 32 gates the negative pulses as shown by waveform I. Pulse separators 30 and 32 are well known in the art and may be simply diode clipping circuits utilizing isolation resistors. The pulses of waveform H are utilized to set the flip-flop 34 whereas the pulses of waveform I are used to reset the flip-flop 34 thereby producing a restored received data signal (RRD) shown on line 33 and shown as waveform L. Note that dependent on the triggering requirements of flip-flop 34 the reset input thereof may be received from the output of inverting amplifier 36. Waveform L is similar to the signal which originally generated the pulses shown as waveform D or more particularly as shown as waveform B. A delay however has been introduced, since the sampling for producing bipolar pulses G takes place in the middle of the data waveform. Accordingly there is a half bit delay period between the originally generated data and the received restored data in the synchronous mode of operation. However, the originally generated data is completely restored of any noise such as cross talk, severe ground shift, etc.

The restored received data may be transferred to terminal 22 and is also transferred to one input of AND gate 52 which is enabled in the absence of an RS signal to transfer the data shown as waveform L through OR gate 54 to the inputs of inverting amplifier 60 and AND gate 58, and the complement thereof to one input of AND gate 62 via inverting amplifier 60.

The bipolar pulses received at terminals 26 and 28 also regenerate their own clock or sync pulse. The pulse waveforms H and I are passed through OR gate 38, waveform I being first inverted by amplifier 36 to produce the positive pulses. The pulses of waveform J are coupled to one input of variable one shot 40. The other input of one shot 40 is a period select input which is set so that each pulse of waveform J will trigger to produce an output pulse shown as waveform K having the same frequency as the frequency of the received data at terminals 26 and 28. The period select signal may be generated by means of a detection circuit, not shown, which may sense the frequency of the received data or may be manually setable by the operator of a communications station, the setting being dependent on the frequency of operation of other stations in the system which are transmitting data. The sync signal of waveform K on line 39 is coupled to one input of AND gate 46 which is enabled at its other input by the inversion by amplifier 44 of the absence of a request to send signal. The sync signal on line 39 may also be coupled to terminal 22 as was the restored received data on line 33. The sync signal of waveform K passes through AND gate 46 and through OR gate gate 48 to the input of the one shot 56. With the sync signal at the input of one shot 56 and the restored data at the inputs of amplifier 60 and gate 58, the operation of gates 58, 62, circuit 64 and isolation means 20 is similar to that stated hereinbefore for the synchronous operation of the second mode or terminal transmit mode.

In the asynchronous mode of operation, reference is now made to the timing diagrams of FIGS. 3A, 3B, 3C, 3G, 3K and 3L hereinafter referred to as waveforms A, B, C, G, K and L respectively. Frequency select switch 16 selects the frequency of 38.4 KHertz and produces a waveform A. Data generated by the terminal 22 is shown as waveform B. It will be noticed that the frequency of the clock signal of waveform A is greater than that of the data generated to insure that data at any frequency will be properly sampled. Thus in this case, the timing pulse produced by one shot 56 and as shown by waveform C occurs for each negative transition of the clock signal shown as waveform A, so that the signal received at gates 58 and 62 are passed and produce a bipolar pulse waveform via bipolar pulse drive circuit 64 as shown by waveform G. These pulses of waveform G are transmitted over a communications line and may be received by another communication apparatus on the other communication apparatuses input terminals, similar to input terminals 26 and 28 of communications apparatus 10. In the first mode or the data received and retransmit mode, such received data, now shown for simplicity as waveform G is separated and sets and resets flip-flop 34 to produce the delayed restored received data shown as waveform L. Also, the one shot 40 is set so that it generates a sync pulse on line 39 shown as waveform K whose frequency is greater than the maximum transmission frequency or preferably 38.4 KHertz. The operation of communication apparatus 10 then proceeds as stated hereinbefore. Two items will be noted, first that the delay between the now restored data of waveform L and the originally generated data, which can be shown as waveform B, is no greater than the period of the clock signal shown as waveform A, and secondly that the polarity of pulses occurring as waveforms H and I shown in FIGS. 2H and 2I respectively, after the initial such pulse of the particular polarity are not operative to effect the operation of flip-flop 34 since such flip-flop has already been set or reset as the case provides. The restored data shown as waveform L is similarly transmitted via mode selection circuit 41 to communication lines coupled to output terminals 68 and 70.

Also included in the communications apparatus 10 is a counter 14 coupled to receive the lowest frequency signal at which data will be communicated. This frequency of 2.4 KHertz, for example, is provided by divider 12. An output indicative of the absence of received data will be generated by counter 14 at the carrier detect (CD) terminal 13 after N cycles of the miminal frequency are received by counter 14 without counter 14 having been reset. Counter 14 is reset by the pulses occurring as waveform J, such pulses indicating the presence of received data at terminals 26 and 28. Thus if a distant station is transmitting pulses, bipolar pulses at the input of terminals 26 and 28 will be received and the carrier detect signal on terminal 13 will not be generated. If bipolar pulses are not received, then the carrier detect signal will be generated after N cycles of counter 14. The carrier detect signal may be coupled to terminal 22 for inhibiting the generation of the request to send signal in which case when data is being received at terminals 26 and 28, the terminal 22 will not be able to transmit data via line 23 and output terminals 68 and 70.

Figure 4:
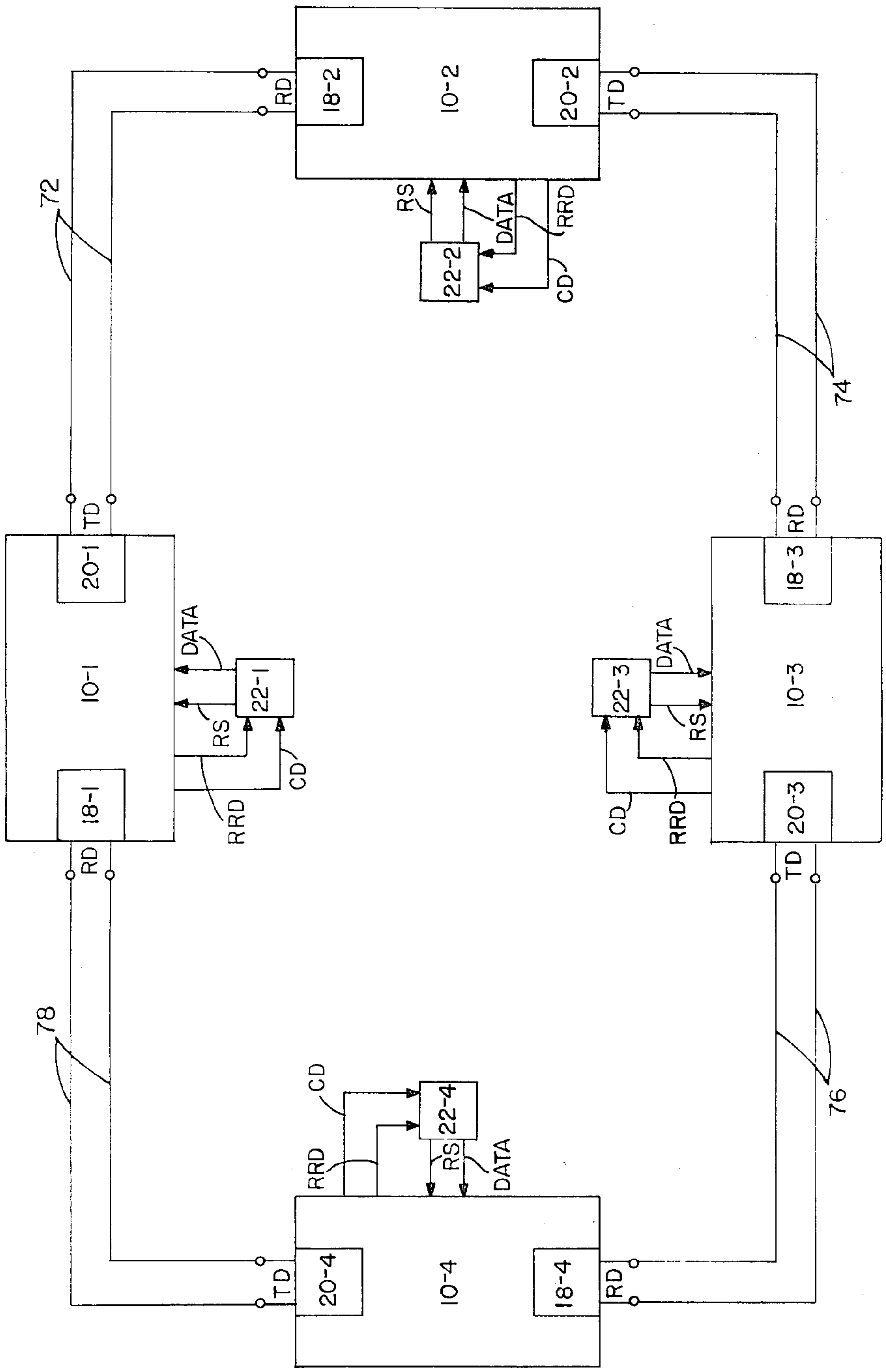
FIG. 4 is a system block diagram illustrating the interconnection of a plurality of communications apparatus as shown in FIG. 1.

In FIG. 4 a plurality of communications apparatus as shown in FIG. 1 are illustrated in a communication system. Four such communications apparatus 10-1, 10-2, 10-3 and 10-4 are shown, each of which incorporates an input isolation means 18 and an output isolation means 20. Coupled for local communication with each of the communications apparatus 10 is a terminal 22 which is operative to transmit data and a request to send signal to the communications apparatus 10 and to receive a restored received data signal and a carrier detect signal. The clock signal (waveform A) and the sync signal (waveform K) may also be coupled between terminal 22 and communications apparatus 10. Outputs of each apparatus 10 are coupled to the inputs 18 of successive apparatuses by means of communications lines 72, 74, 76 and 78 which may be simply twisted wire. These communication lines 72, 74, 76 and 78 may be several hundred feet in length. One of the communications apparatus may be a master station and may be coupled to a central computer, not shown. For example, if communication apparatus 10-1 is the master station, data transmitted by it to, for example, apparatus 10-3 would pass through apparatus 10-2 and in fact would repeat through apparatus 10-4 to the input of master station 10-1. At this point, repetitive data communication may be inhibited by the master station. Likewise, communication between stations such as apparatus 10-3 to apparatus 10-2 would pass through successive apparatus 10-4, through master station 10-1 and to apparatus 10-2. In this manner the master station 10-1 would be aware of and could control communication between individual communications apparatus. The control of transmission may be simply that provided by more sophisticated polling means which are not part of this invention. Also, any two stations within the group of stations shown in FIG. 4 may transmit and receive data simultaneously in full duplex operation as if they were the only two stations in the system. The remaining stations act as repeaters.

Having now described the invention what is claimed as new and novel and for which it is desired to secure Letters Patent is:

1. Apparatus for receiving and transmitting signals having first and second states, said apparatus comprising:
   A. input means coupled to receive said signals;
   B. means coupled to said input means for separating said first state signals from said second state signals;
   C. bistable means coupled to produce a first output level in response to said first state signals and coupled to produce a second output level in response to said second state signals;
   D. first means coupled for response to said first and second state signals for generating a waveform having a frequency which is no less than the frequency of said received signals;
   E. first means for generating timing pulses upon the occurrence of first transitions of said waveform;
   F. a second means for generating a first state output signal in response to the simultaneous occurrence of said first output level and said timing pulse and for generating a second state output signal in response to the simultaneous occurrence of said second level and said timing pulse; and
   G. output means, coupled to said second means for generating, for transmitting said signals.

2. Apparatus as defined in claim 1 wherein:
   A. said input means includes
      1. input terminals for receiving said signals
      2. output terminals, and
      3. means for electrically isolating said input and output terminals while coupling said signals to said output terminals; and wherein;
   B. said output means includes
      1. input terminals for receiving said first and second state output signals;
      2. output terminals, and
      3. means for electrically isolating said output means input and output terminals while coupling said first and second state output signals to said output means output terminals.

3. Apparatus as defined in claim 2 wherein said received and transmitted signals are bipolar signals so that said first and second states of said received and transmitted signals are first and second polarities respectively.

4. Apparatus as defined in claim 3 wherein the frequency of said waveform is substantially equal to the frequency of said received signals.

5. Apparatus as defined in claim 3 wherein said each of said input means and output means are isolation transformers.

6. Apparatus as defined in claim 3 wherein each of said bistable means, said first means and said second means for generating includes a multivibrator.

7. Apparatus as defined in claim 3 further comprising:
   A. signal transmit terminal means for generating signals to be transmitted having first and second states and for generating a request to send signal;
   B. clock signal generator means for producing clock signals having a first frequency;
   C. first gate means for enabling the occurrence of said timing pulses in response to said clock signals when said request to send signal is generated and disabling the occurrence of said timing pulses in response to the occurrence of said first transitions of said waveform when said request to send signal is generated; and
   D. second gate means for disabling said bistable means from transferring said first and second output levels to said second means for generating when said request to send signal is generated and for enabling signals from said terminal means to generate said first and second state output signals respectively in response to the simultaneous occurrence of said terminal means first state signal and said timing pulse and in response to the simultaneous occurrence of said terminal means second state signal and said timing pulse when said request to second signal is generated.

8. Apparatus as defined in claim 7 wherein said timing pulses are generated to sample the state of said bistable means output levels and said terminal means output states at substantially the middle of said signals indicated by said levels and states and wherein
   A. in synchronous operation of said apparatus
      1. said first frequency of said clock signals is equal to the frequency of said terminal means signals, and
      2. said sync signal frequency is equal to the frequency of said received signals; and
   B. in asynchronous operation of said apparatus
      1. said first frequency of said clock signals is greater than the frequency of said terminal means signals, and
      2. said sync signal frequency is greater than the frequency of said received signals.

9. Apparatus as defined in claim 7 wherein said clock signal generator means includes further means for producing second clock signals having a second frequency, said second frequency being no greater than the minimal frequency of said received signals and said terminal means signals; and further comprising:

A. counter means for dividing said second clock signal frequency by a factor N thereby producing a third clock signal having a third frequency;
B. means for resetting said counter means in response to said received signals thereby inhibiting the generation of said third clock signal; and
C. means for indicating the absence of said received signals when said third clock signal is generated.

10. Apparatus as defined in claim 9 further comprising means for inhibiting said terminal from generating said request to send signal when said third clock signal is absent.

11. Communications apparatus for receiving and transmitting signals, having first and second states, over communication lines, said apparatus including means for restoring said signals received and means for transmitting said signals received and including local terminal means for generating signals having first and second states to be transmitted and for generating a request to send signal so that said terminal means signals may be transmitted, wherein A. said means for restoring signals received comprises
   1. means for separating said first and second states of said signals, and
   2. bistable means coupled to said means for separating for generating a first level of said restored signal in response to the occurrence of said first state of said received signal and for generating a second level of said restored signal in response to the occurrence of said second state of said received signal;
B. means responsive to said first and second states of said received signals for generating a sync signal whose frequency is no less than the frequency of said received signals;
C. means for generating a clock signal having a first frequency which is no less than the frequency of said terminal means signals to be transmitted;
D. wherein said means for transmitting comprises
   1. first gate means for passing either said clock signal or said sync signal in response to the presence or absence respectively of said request to send signal,
   2. second gate means for passing either said terminal means signal or said restored signal in response to the presence or absence respectively of said request to send signal.
   3. means responsive to whichever of said clock or sync signals passes through said first gate means for generating a timing pulse for sampling signals to be transmitted,
   4. first means for generating a first state output signal for transmission over said communication lines in response to the simultaneous occurrence of said timing pulse and said first level of whichever of said restored signal or terminal means signal is passed through said second gate means, and
   5. second means for generating a second state output signal for transmission over said communications lines in response to the simultaneous occurrence of said timing pulse and said second level of whichever of said restored signal or terminal means signal is passed by said second gate means.

12. Communications apparatus as defined in claim 11 further comprising a plurality of further ones of said communications apparatus, each of said communications apparatus providing substantially similar means and wherein the first of said communications apparatus, is coupled over communications lines to transmit signals for receipt by a successive one of said communications apparatus and wherein the last of said communications apparatus is coupled over communications lines to transmit signals for receipt by said first of said communications apparatus.

13. Apparatus as defined in claim 12 further comprising means in each of said plurality of communications apparatus for detecting the absence of transmitted signals over said communications lines and for thereby enabling at least one of said locally coupled terminals of said communications apparatus to transmit signals over said lines.

14. Apparatus as defined in claim 11 wherein said received signals are bipolar signals so that said first state thereof is a first polarity signal and so that said second state thereof is a second polarity signal.

* * * * *